United States Patent
Dilip et al.

(10) Patent No.: US 6,657,990 B1
(45) Date of Patent: Dec. 2, 2003

(54) METHOD AND APPARATUS FOR PROVIDING NETWORK-BASED INTERACTION

(75) Inventors: Venkatachari Dilip, Cupertino, CA (US); Janardhanan Jawahar, San Jose, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/052,824

(22) Filed: Mar. 31, 1998

(51) Int. Cl.[7] .................. H04L 12/66; G06F 15/15; H04M 11/00
(52) U.S. Cl. .................. 370/352; 370/356; 709/202; 709/204; 379/100.16; 379/202
(58) Field of Search .................. 370/351–352, 370/356, 400–401, 402, 264, 265, 465, 389, 395.1; 379/93.17, 201–202, 93.21, 100.15, 100.01, 100.16, 205, 226–227, 266.1, 265.01–265.09; 709/204, 206–207, 201–202; 348/15; 707/5, 4, 10; 705/14, 26; 345/705

(56) References Cited

U.S. PATENT DOCUMENTS

| | | | |
|---|---|---|---|
| 5,001,710 A | 3/1991 | Gawrys et al. .......... 370/110.1 |
| 5,359,526 A | 10/1994 | Whittington et al. | |
| 5,583,922 A | * 12/1996 | Davis et al. ............ 379/93.17 |
| 5,778,178 A | 7/1998 | Arunachalam ......... 395/200.33 |
| 5,884,032 A | 3/1999 | Bateman et al. ....... 395/200.34 |
| 5,889,774 A | * 3/1999 | Mirashrafi et al. .......... 370/352 |
| 5,916,302 A | * 6/1999 | Dunn et al. ................ 370/260 |

* cited by examiner

Primary Examiner—Dang Ton
Assistant Examiner—Maikhanh Tran
(74) Attorney, Agent, or Firm—Blakely, Sokloff, Taylor & Zafman LLP

(57) ABSTRACT

A system is provided that establishes communication between a first system and a second system. A request is received to establish a connection between the first system and the second system. The system establishes a first connection between the first system and the second system. The first connection is capable of communicating visual data between the first system and the second system. The system also establishes a second connection between the first system and the second system. The second connection is capable of communicating audible data between the first system and the second system. The first system and the second system communicate using both the first connection and the second connection. The first connection can include a network communication link such as an Internet communication link. The second connection may include a telephone communication link capable of communicating telephony signals between the first system and the second system. The first system and the second system can communicate by utilizing both the first connection and the second connection simultaneously. Changes made to visual data on the first system can be communicated to the second system across the first connection.

31 Claims, 8 Drawing Sheets

METHOD AND APPARATUS FOR PROVIDING NETWORK-BASED INTERACTION

FIELD OF THE INVENTION

The present invention relates to communication systems. More specifically, the invention provides a system that provides network-based interaction between two systems.

BACKGROUND

Various types of communication systems allow two systems or two individuals to communicate with one another. Communication systems are available that allow two individuals to communicate with one another across a network, such as a data network or a telephone switching network. Communicating across a telephone switching network using a conventional telephone allows two individuals to exchange audible information, but does not provide a mechanism for exchanging visual information.

Video conferencing systems allow two individuals to communicate with one another using specific video conferencing hardware and software. This video conferencing hardware and software may be expensive, particularly for an individual user or an infrequent user of the system. Certain video conferencing systems require similar hardware and software at each end of the communication link. In these systems, if two individuals do not share compatible video conferencing hardware and software, they cannot conduct a video conference. Thus, although video conferencing systems allow two individuals to exchange visual and audible data across a common communication link, existing systems can be expensive and require specialized hardware and software.

It is therefore desirable to provide a system that allows two individuals to exchange both visual data and audible data without requiring specialized hardware or software.

SUMMARY OF THE INVENTION

Embodiments of the present invention provide a mechanism that allows two systems to exchange both audible data and visual data. The invention allows the exchange of audible and visual data without requiring specialized hardware or software. Embodiments of the invention automatically communicate changes in visual data from one system to another.

An embodiment of the invention receives a request to establish a connection between a first system and a second system. A first connection is established between the first system and the second system, in which the first connection is capable of communicating visual data between the first system and the second system. A second connection is then established between the first system and the second system. The second connection is capable of communicating audible data between the first system and the second system. The first system and the second system are able to communicate with one another using both the first connection and the second connection.

In a particular embodiment of the invention, the first connection includes a network communication link capable of communicating data between the first system and the second system.

In another embodiment, the second connection includes a telephone communication link capable of communicating telephony signals between the first system and the second system.

Embodiments of the invention allow a user of the first system to communicate with a user of the second system by utilizing both the first connection and the second connection simultaneously.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention is related to a network-based communication system capable of transmitting data and other signals between two individuals. Embodiments of the invention use two separate communication links to exchange information and data between the two individuals. For example, a first communication link may communicate data across a data network and a second communication link may communicate voice signals across a telephone network, such as a public switched telephone network (PSTN). Embodiments of the present invention allow two individuals to exchange both data and voice signals simultaneously without requiring specialized software or hardware.

Particular embodiments of the invention are described below as used in a transaction processing environment. However the teachings of the present invention may be used in any data communication environment and with any type of data communication system. Embodiments of the invention described below communicate information (such as web page information) across a network. In alternate embodiments, the teachings of the present invention are applied to the communication of any type of information across any type of communication link.

Exemplary transactions in a transaction processing environment include telephone calls, facsimile transmissions, electronic mail (e-mail), video sessions, or network sessions (such as an Internet session). A particular transaction can be either inbound (e.g., received by a transaction processing system) or outbound (e.g., transmitted from a transaction processing system).

A transaction processing system is any device capable of receiving, transmitting, queuing, routing, or otherwise processing a transaction. A transaction processing system may also handle mixed transactions (e.g., receive a telephone call and respond to the telephone call using e-mail). Example transaction processing systems include automatic call distributors (ACDs), call centers, and other telephone call processing devices. The teachings of the present invention may be used with any type of transaction processing system.

Figure 1:
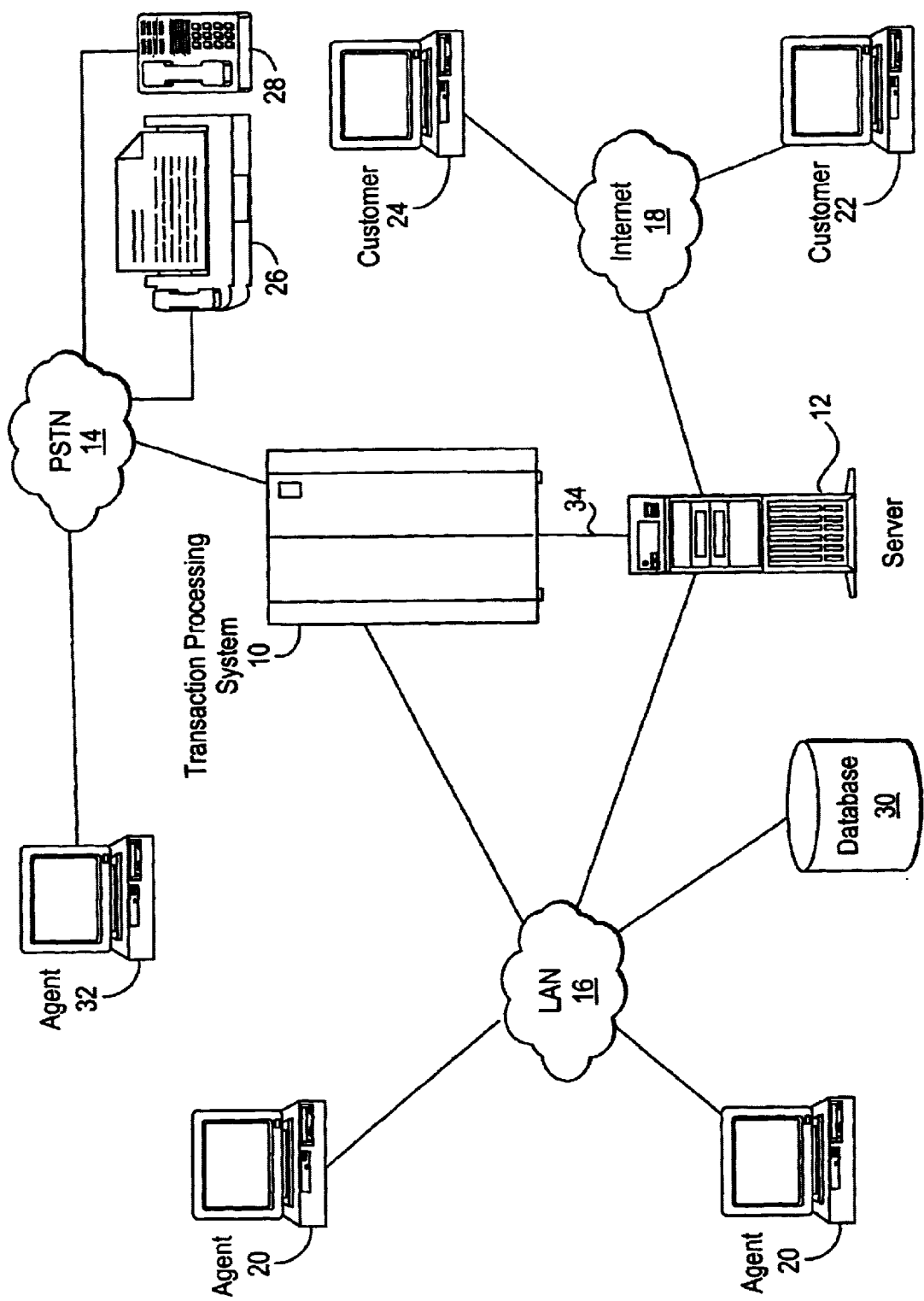
FIG. 1 illustrates an embodiment of a transaction processing environment in which the present invention may be used.

FIG. 1 illustrates an embodiment of a transaction processing environment in which the present invention may be used. The transaction processing environment of FIG. 1 allows transaction initiators (e.g., customers) to contact an agent (e.g., a customer service agent) using various types of transactions. Similarly, the transaction processing environment allows an agent to respond to a received transaction (e.g., received from a customer) or initiate a new transaction.

A transaction processing system 10 is coupled to a server 12, a public switched telephone network (PSTN) 14 and a local area network (LAN) 16. Transaction processing system 10 is capable of processing various types of transactions, such as telephone calls, electronic mail (e-mail), voice mail, and facsimiles. Transaction processing system 10 is capable of receiving transactions from PSTN 14, LAN 16, and server 12. Similarly, transaction processing system 10 is capable of transmitting transactions to PSTN 14, LAN16, and server 12. For example, transaction processing system 10 can receive an incoming telephone call directly via PSTN 14. Another incoming telephone call may be received by server 12 (e.g., an Internet telephone call received across Internet 18) and provided to transaction processing system 10 across a communication link 34 or across LAN 16. In other situations, transaction processing system 10 may receive an incoming e-mail from server 12 or LAN 16

FIG. 1 illustrates a single server 12 capable of interacting with various components in the transaction processing environment. For example, server 12 may operate as a web server, an e-mail server, a fax server, and a video server. Additionally, server 12 can perform the functions of a control server, as discussed below. In alternate embodiments of the invention, the transaction processing environment may include multiple servers, in which each server is responsible for one or more types of transactions. For example, a web server processes all web-based transactions, an e-mail/fax server processes all e-mail and facsimile transactions, and a control server controls and manages various transactions and communication sessions in the transaction processing environment.

LAN 16 can be any type of network, including an intranet network, capable of communicating information between various nodes in the network. Further, LAN 16 may use any network topology and communicate data using any communication protocol. As shown in FIG. 1, multiple agents 20 are coupled to LAN 16. In a typical transaction processing environment, hundreds or thousands of agents may be coupled to one or more LANs 16, which are coupled to transaction processing system 10. Alternatively, some or all of the agents 20 may be coupled directly to transaction processing system 10, rather than coupled through LAN 16.

Although agents 20 are represented in FIG. 1 by a computer, a particular agent 20 may utilize any type of device or system that allows interaction between the agent and another person or device (such as a customer or a customer's computer). For example, an agent handling only telephone call transactions may only use a telephone system, without requiring a computer. Similarly, an agent handling only e-mail messages may require a computer system, but not a telephone. In a particular embodiment of the invention, each agent has a computer system and a telephone (which may be integrated into the computer system), such that the agent is capable of handling and responding to multiple types of transactions (e.g., telephone calls, e-mail, voice mail, and facsimiles).

An agent 32 is not coupled to LAN 16, but instead is coupled to PSTN 14. Agents 20, discussed above, are located locally to transaction processing system 10 or include an access mechanism allowing agents 20 to establish a connection to LAN 16. Agent 32 is a remote agent or otherwise unable to directly connect to LAN 16. For example, agent 32 may be working at a location geographically distant from transaction processing system 10, such as working at home or traveling. Agent 32 establishes a connection with transaction processing system 10 across PSTN 14. Alternatively, agent 32 may connect with LAN 16 or transaction processing system 10 through Internet 18 or any other network or communication system.

A database 30 is coupled to LAN 16 and is used by transaction processing system 10, agents 20 and 32, and server 12 to store and retrieve various types of information. For example, database 30 may contain information about the transaction processing system, the performance of the system, and the agents and customers that use transaction processing system 10. Since database 30 is coupled to LAN 16, all agent computers, servers, and other devices coupled to LAN 16 are capable of storing and retrieving information from the database.

As shown in FIG. 1, Internet 18 is coupled to server 12 and customer computers 22 and 24. Customer computer 22 may include an Internet phone for establishing verbal communications between the customer and an agent across Internet 18. The customer using computer 24 has a telephone 28 and a fax machine 26 coupled to PSTN 14 and located near computer 24. Thus, the user of computer 24 may communicate with an agent of the transaction processing system using Internet 18 (e.g., using an Internet phone or e-mail application), fax machine 26, telephone 28, or any combination thereof. For example, customer 24 may generate and transmit an e-mail message across Internet 18 to server 12. Server 12 then communicates the e-mail to transaction processing system 10, which provides the e-mail to a particular agent or group of agents for response. Agents may be grouped together based on area of expertise, company department, or type of support provided (e.g., sales or technical support). The agent responding to the e-mail can respond with another e-mail message or may respond by telephone, facsimile, or any other type of transaction supported by the transaction processing system and the transaction initiator. In particular embodiments of the invention, the transaction initiator may specify the type of transaction used by the responding agent. For example, a transaction initiator may generate an e-mail transaction, but request that an agent respond with a telephone call. Although customer computers 22 and 24 are shown coupled directly to Internet 18, it will be appreciated that any communication mechanism can be used to couple computers 22 and 24 to Internet 18, such as PSTN 14 and an Internet Service Provider (ISP).

In alternate embodiments, Internet 18 may be replaced with any communication network using any communication protocol.

The environment illustrated in FIG. 1 includes a separate LAN 16 and Internet 18. In alternate environments, LAN 16 and Internet 18 are merged into a single communication network capable of communicating information between any two or more devices coupled to the communication network.

Figure 2:
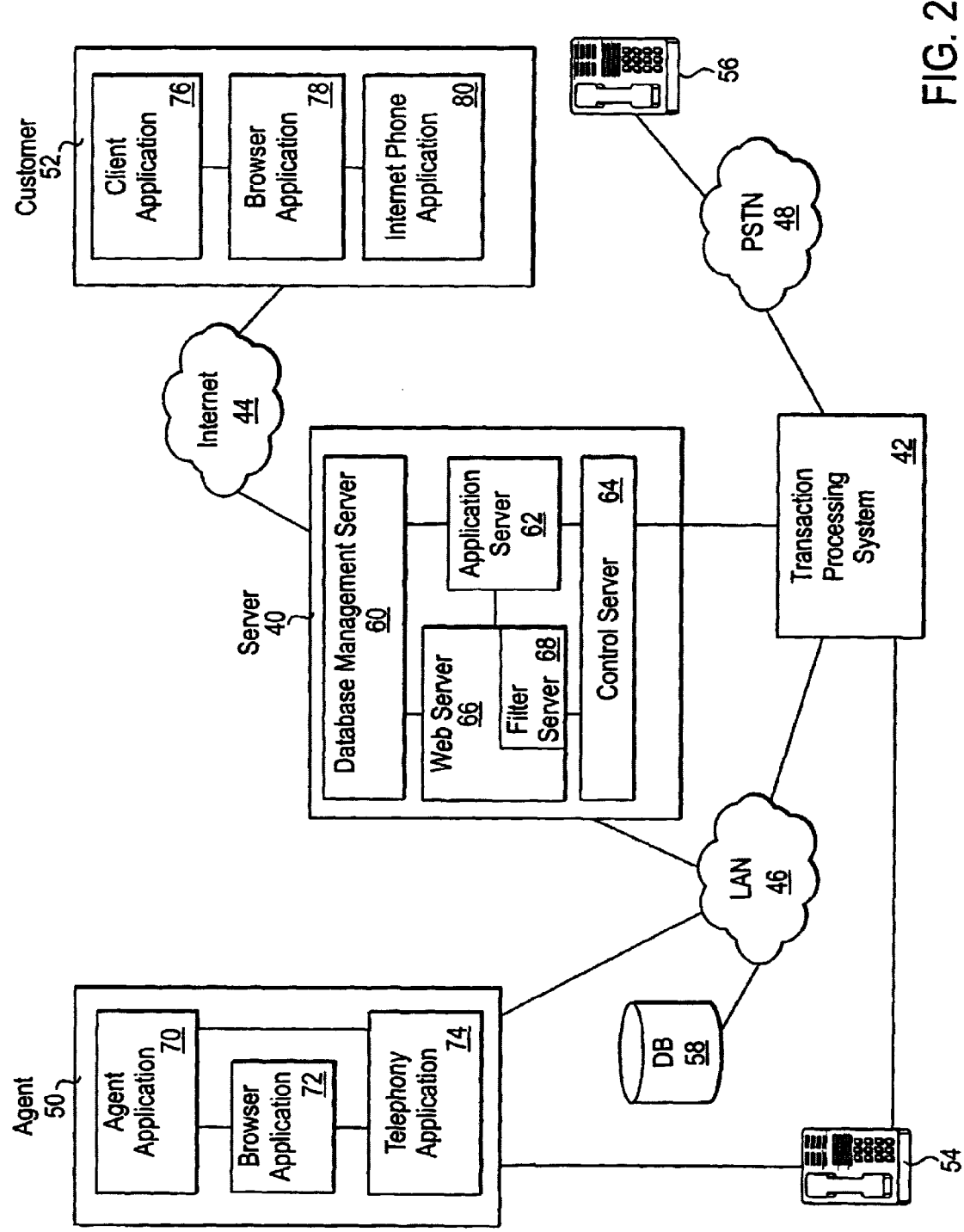
FIG. 2 illustrates an embodiment of a transaction processing environment including a server, an agent computer system, a customer computer system, and a transaction processing system coupled together using various networks.

FIG. 2 illustrates an embodiment of a transaction processing environment including a server 40, an agent computer system 50, a customer computer system 52, and a transaction processing system 42 coupled together using various networks. FIG. 2 illustrates a single agent computer system 50 and a single customer computer system 52. However, a typical transaction processing environment includes multiple agent computer systems and multiple customer computer systems. Server 40 is coupled to Internet 44, a LAN 46, and transaction processing system 42. Server 40 includes a database management server 60, an application server 62, a control server 64, and a web server 66. Additional details regarding server 40 are discussed below. In alternate embodiments, server 40, computer systems 50 and 52, and transaction processing system 42 are coupled together using different network configurations and network connections. Transaction processing system 42 is capable of processing various types of transactions, such as telephone calls, e-mail, voice mail, and facsimiles. In a particular embodiment of the invention, transaction processing system 42 is an automatic call distributor (ACD).

Agent computer system 50 includes an agent application 70, a browser application 72, and a telephony application 74. Agent application 70 interacts with other devices shown in FIG. 2 (e.g., server 40 and transaction processing system 42). For example, agent application 70 may retrieve information about a transaction initiator (such as account information and the types of products or services purchased) and display that information to the agent. In this example, agent application 70 is a client of database management server 60, which retrieves the appropriate information about the transaction initiator from a database 58. If the agent is a technical support agent, the information about the transaction initiator may include the types of products owned by the transaction initiator, previous problems encountered by the transaction initiator, and known problems with the products. Additionally, agent application 70 can display information regarding agent performance, the overall performance of the transaction processing system, and the current status of the agent (e.g., active or inactive).

Browser application 72 is any browser capable of communicating information across a communication link and displaying received information to the agent. In a particular embodiment, browser application 72 is capable of retrieving information from Internet 44 (e.g., in the form of Hypertext Markup Language (HTML) pages). Exemplary browser applications include Netscape Communicator™ sold by Netscape Communications Corporation of Mountain View, Calif., and Internet Explorer™ sold by Microsoft Corporation of Redmond, Wash. Embodiments of the invention exchange information between agent application 70 and browser application 72. In other embodiments of the invention, agent application 70 and browser application 72 are integrated into a single application.

Telephony application 74 controls a telephone 54 coupled to agent computer system 50 and transaction processing system 42. In other embodiments of the invention, a telephone adapter replaces telephone 54 and permits agent computer system 50 to perform the functions of a conventional telephone. For example, a WinSet™ adapter sold by Aspect Telecommunications of San Jose, Calif., may be used instead of telephone 54. Another embodiment of the invention uses a software-based telephone in place of telephone 54. In this embodiment, the software-based telephone is integrated into telephony application 74 and communicates with transaction processing system 42 through server 40 or LAN 46.

Customer computer system 52 includes a client application 76, a browser application 78, and an Internet phone application 80. Client application 76 may be any type of application capable of being executed by customer computer system 52. For example, client application 76 can be a word processor from which text is copied to browser application 78. Although FIG. 2 illustrates client application 76 and browser application 78 coupled to one another, in alternate embodiments of the invention there is no direct coupling of client application 76 and browser application 78.

Browser application 78 is any browser capable of communicating information across a communication link and displaying received information to the customer. Browser application 78 is not necessarily the same type of browser application used in agent computer system 50. In a particular embodiment, browser application 72 is capable of retrieving information from Internet 44 (e.g., in the form of Hypertext Markup Language (HTML) pages). Exemplary browser applications include Netscape Communicator™ and Internet Explorer™, identified above. Embodiments of the present invention can be implemented without any interaction between browser application 78 and other applications executed by customer computer system 52.

Internet phone application 80 allows the user of computer system 52 to establish a voice communication link across Internet 44 instead of using a telephone 56 and a PSTN 48. In particular embodiments of the invention, customer computer system 52 does not contain an Internet phone application. In these embodiments, the user of computer system 52 uses telephone 56 and PSTN 48 to establish a voice communication link with another individual or system. Alternatively, the user of computer system 52 may use a text chat window, discussed below with respect to FIG. 6, to communicate with another individual or system.

Database management server 60 (contained in server 40) manages information contained in database 58. The information stored in database 58 includes customer information, product or service information, transaction tracking information, and other data that may be used by transaction processing system 42, agents, customers, or server 40. Application server 62 communicates with database management server 60 and provides information to agent application 70. For example, application server 62 can retrieve information about a customer from database 58 using database management server 60. The retrieved information is then provided to agent application 70 across LAN 46 for display on agent computer system 50.

Control server 64 performs multiple control and management functions, as discussed in greater detail below with respect to FIG. 3. Control server 64 establishes and maintains communication links between multiple pairs of agents and customers. Control server 64 communicates with transaction processing system 42 to locate one or more available agents, establishes data and/or voice connections between agents and customers, and controls the flow of data between agents and customers.

Web server 66 communicates data, in the form of web pages, to browser applications 72 and 78. Additionally, web server 66 stores web pages and other web-based information used by the devices in the transaction processing environment. Web server 66 includes a filter service 68 that filters and modifies various web pages. Filter service 68 changes the web page content (e.g., by adding JavaScript methods) to allow the coordination and exchange of information between browser applications 72 and 78. For example, if a customer using browser application 78 changes information on a web page by entering information on a form, the information entered by the customer may be communicated to the agent's browser application 72. Similarly, if an agent selects a different web page using browser application 72, the selected web page may be delivered to browser application 78 for viewing by the customer. Thus, the changes made to the web page by filter service 68 allow other services, discussed below, to coordinate web pages and web page information between browser applications 72 and 78 such that the agent and the customer view the same web page with the same information. Additional details regarding the various services that coordinate and exchange information between the browser applications are provided below with respect to FIGS. 3 and 4.

Figure 3:
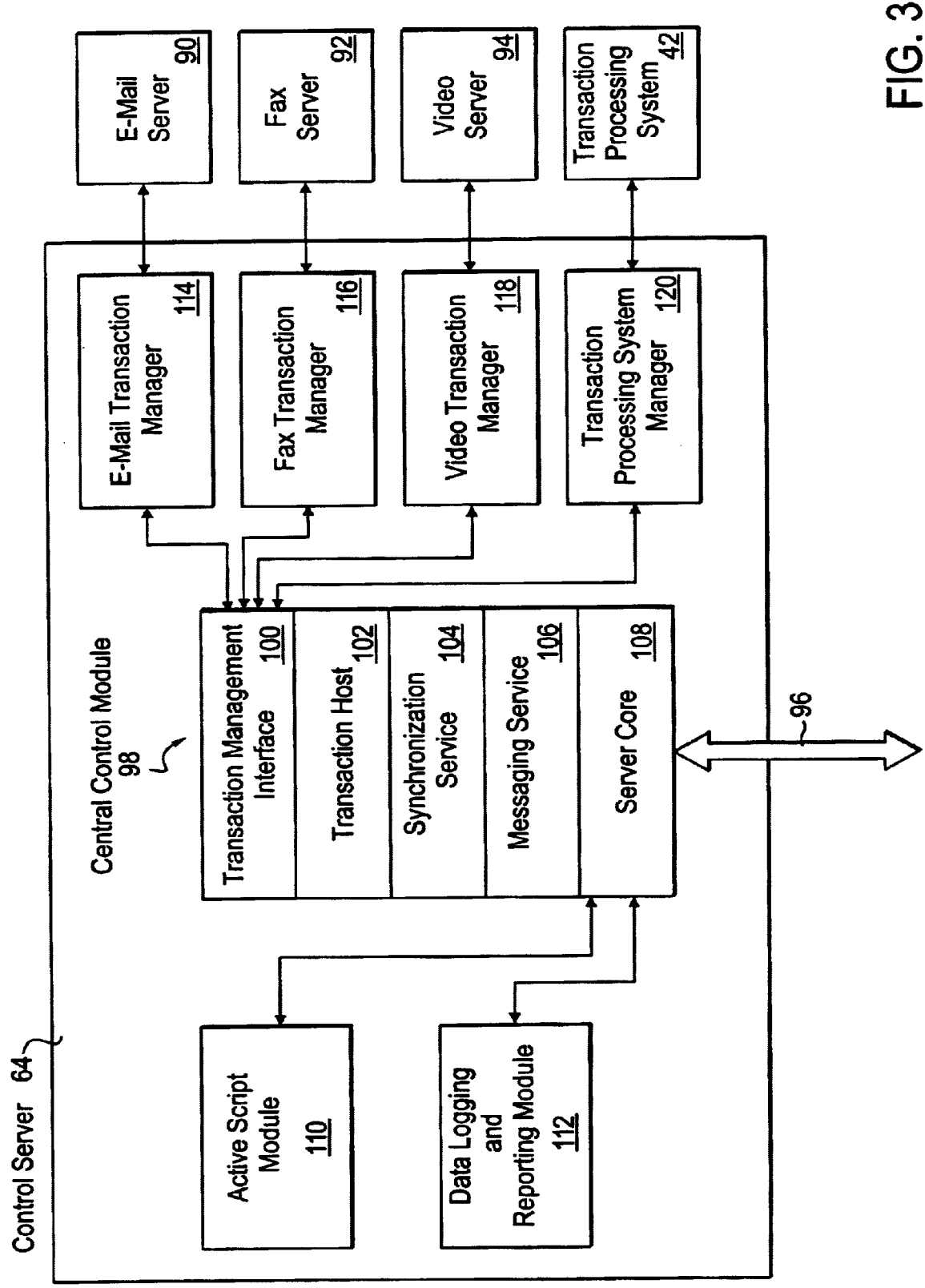
FIG. 3 illustrates an embodiment of a control server.

FIG. 3 illustrates an embodiment of control server 64, shown as part of server 40 in FIG. 2. Control server 64 is shown coupled to an e-mail server 90, a fax server 92, a video server 94, and transaction processing system 42. E-mail server 90 handles both incoming e-mail (e.g., from a customer) and outgoing e-mail (e.g., from an agent). Fax server 92 handles both incoming and outgoing facsimiles. Video server 94 handles video information and video sessions, for use by an agent, customer, or other device or user in the transaction processing environment. Additionally, video server 94 handles other multimedia information and multimedia sessions (e.g., sessions that exchange both audio and video data). Transaction processing system 42 handles various transactions, as discussed above. E-mail server 90, fax server 92, and video server 94 may be coupled directly to control server 64 (and server 40 shown in FIG. 2) or coupled to control server 64 through a network (e.g., LAN 46) or other communication medium. In alternate embodiments of the invention, any one or more of servers 90–94 can be contained within server 40 (FIG. 2) and coupled directly to control server 64.

Control server 64 communicates with e-mail server 90, fax server 92, and video server 94 using any type of communication medium, such as LAN 46. In this embodiment of the invention, control server 64 communicates with transaction processing system 42 using a dedicated communication line, as shown in FIG. 2. In alternate embodiments of the invention, control server 64 communicates with transaction processing system 42 across a network, such as LAN 46 (FIG. 2). Control server 64 also communicates with other systems, such as browser applications and web servers, using a communication link 96. In an embodiment of the invention, communication link 96 is a network communication link (e.g., a communication link in LAN 46). Alternatively, communication link 96 may be a dedicated communication link to one or more devices in the transaction processing environment. Communication link 96 is used to communicate various commands and other information between control server 64 and other devices.

As shown in FIG. 3, control server 64 includes an active script module 110 that handles the display of scripts and other information to an agent using the agent's browser application 72. An embodiment of active script module 110 generates scripts in the form of web pages that can be displayed on the agent's browser application. Additional details regarding agent scripts and other information displayed using an agent's browser application are provided below with respect to FIG. 6.

A data logging and reporting module 112 controls the storage (or logging) of transaction information in database 58 using database management server 60. Additionally, module 112 is capable of generating various types of reports summarizing or identifying performance characteristics and other information related to the transaction processing environment. For example, module 112 may generate reports detailing the overall transaction handling performance, such as the number of transactions handled per hour, the average response time for each type of transaction, and the number of transaction responses that exceeded a quality of service limit for the transaction.

A central control module 98 includes a transaction management interface 100, a transaction host 102, a synchronization service 104, a messaging service 106, and a server core 108. Server core 108 receives new requests (e.g., on communication link 96) from other devices in the transaction processing environment and provides the request to one or more other modules for processing. For example, server core 108 may continuously monitor communication link 96 for request signals that can be handled by server core 108. If the request signal is a request to generate a performance report, server core 108 forwards the request to data logging and reporting module 112 for processing. Module 112 then generates the requested report and provides the report to server core 108, which communicates the report to the appropriate device via communication link 96. Similarly, if the request signal is a request for an agent script, server core 108 forwards the request to active script module 110, which selects or generates an appropriate agent script. Module 110 provides the agent script to server core 108, which then communicates the agent script to the appropriate device (e.g., the requesting device).

Requests that cannot be handled by active script module 110 or data logging and reporting module 112 are communicated to another portion of central control module 98 for processing. Messaging service 106 establishes and manages message types used to communicate information between two or more individuals or devices in a transaction processing environment (e.g., message types used to communicate information between an agent and a customer). After a communication link has been established between, for example, an agent and a customer, messaging service 106 maintains the network or communication addresses for both the agent and customer. Typically, messaging service 106 establishes and manages multiple communication links for multiple customer agent communications.

Synchronization service 104 synchronizes changes between all participants in a particular communication. For example, in an agent-customer communication, any changes entered to a web page by the customer are identified by synchtonization service 104, and provided to the agent's browser application. Thus, synchronization service 104 ensures that all participants in a communication are provided with the same information.

Transaction host 102 manages various portions of the interaction between, for example, an agent and a customer. Transaction host 102 maintains the status of multiple interactions and maintains the identity (such as the network or communication address) of each participant involved in each interaction. If a request is received to provide information to a participant, then transaction host 102 determines the address associated with the participant and provides the address to the appropriate module responsible for providing the requested information.

Transaction management interface 100 is coupled to an e-mail transaction manager 114, a fax transaction manager 116, a video transaction manager 118, and a transaction processing system manager 120. Transaction management interface 100 manages the interaction and exchange of information between central control module 98 and the various transaction managers 114–120. Each transaction manager 114–120 handles a particular type of transaction, and communicates with the server responsible for that transaction type. In alternate embodiments of the invention, two or more of transaction managers 114–120 are combined into a single transaction manager. When server core 108 receives a request that requires interaction with a server or device external to control server 64, then transaction management interface 100 contacts the appropriate transaction manager for processing the request. For example, if server core 108 receives a request to select an agent to handle a transaction, then transaction management interface 100 contacts transaction processing system manager 120 to request an agent from transaction processing system 42.

Transaction management interface 100 may receive requests (or calls for service) from server core 108 or transaction host 102. Additionally, transaction management interface 100 may receive requests from any transaction manager 114–120. For example, e-mail transaction manager 114 may notify transaction management interface 100 that e-mail server 90 has received an e-mail that requires processing. Transaction management interface 100 then communicates the information regarding the received e-mail to other services or managers to determine how the e-mail should be handled. For example, transaction processing system manager 120 may be contacted to identify an agent to handle the e-mail. The manner in which the e-mail is to be handled is then communicated to e-mail transaction manager 114, which then instructs e-mail server 90 regarding the processing of the e-mail.

Figure 4:
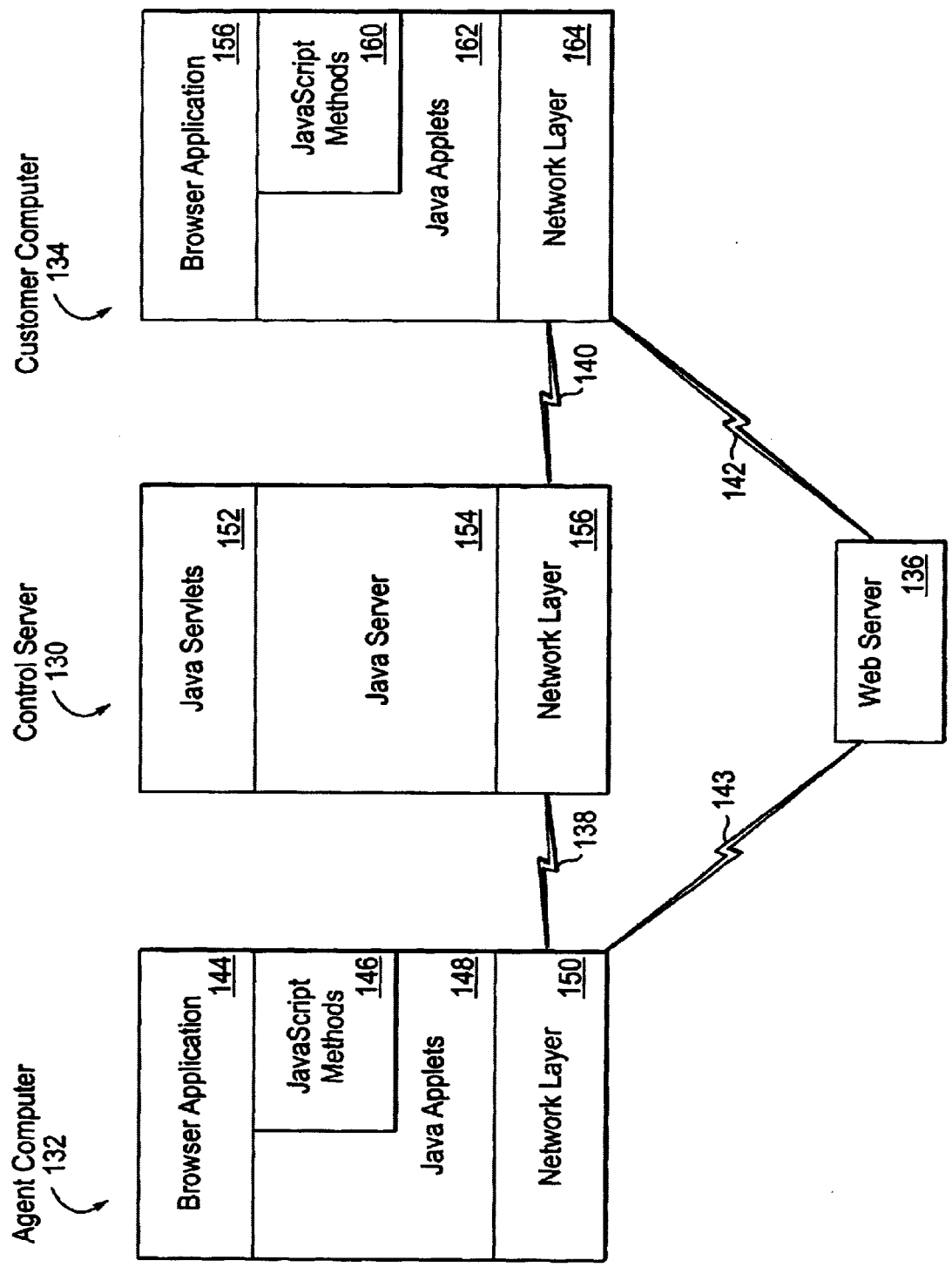
FIG. 4 illustrates an embodiment of a system architecture for communicating information between various devices in a transaction processing environment.

FIG. 4 illustrates an embodiment of a system architecture for communicating information between various devices in a transaction processing environment. The system architecture of FIG. 4 includes a control server 130, an agent computer 132, and a customer computer 134. Agent computer 132 is coupled to control server 130 via communication link 138 (e.g., LAN 46 in FIG. 2) and coupled to a web server 136 via communication link 143 (e.g., Internet 44). Customer computer 134 is coupled to control server 130 using communication link 140 (e.g., Internet 44 in FIG. 2). Customer computer 134 is also coupled to web server 136 via communication link 142 (e.g., Internet 44). Web server 136 stores and distributes various web pages requested by a browser application. Although web server 136 and control server 130 are shown as two separate servers in FIG. 4, they may be hosted by the same hardware or the same server system.

Agent computer 132 contains a browser application 144 of the type discussed above with respect to FIG. 2. The embodiment of the system architecture shown in FIG. 4 is implemented using the Java™ programming language (Java is a trademark of Sun Microsystems Inc. of Mountain View, Calif.). Alternate embodiments of the invention may be implemented using other programming languages, including object-oriented programming languages. Agent computer 132 contains one or more JavaScript methods 146 and one or more Java applets 148. A JavaScript method is a sequence of instructions that perform various operations and have the ability to invoke Java methods. A Java applet is a program, written in Java, that may be stored within a web page. When the web page is retrieved by a browser application, the Java applet is executed by the browser and performs the programmed operations. The activity or operation performed by the agent (or the agent's browser application 144) determines whether a JavaScript method or a Java applet is activated. For example, if the agent clicks an icon associated with a Java applet, then the Java applet is activated. However, if the agent performs an operation that is associated with a JavaScript method, then the JavaScript method is performed in response to the operation.

Agent computer 132 includes a network layer 150, which is a logical layer at which agent computer 132 communicates with other devices via communication link 138. Control server 130 has a network layer 156, which communicates with control layer 150 to exchange information between control server 130 and agent computer 132. A Java server 154 communicates with network layer 156 to exchange information with other devices (e.g., agent computer 132 and customer computer 134). Java server 154 corresponds to server core 108 (FIG. 3) and controls the overall operation of control server 130. Java server 154 is implemented using the Java programming language. Java server 154 communicates with one or more Java servlets 152, which perform various operations necessary to process transactions and communicate information between devices. In a particular embodiment, Java servlets 152 may correspond to various modules shown in FIG. 3, such as transaction management interface 100, transaction host 102, synchronization service 104, messaging service 106, active script module 110, and data logging and reporting module 112.

A network layer 164 in customer computer 134 communicates with network layer 156 and with web server 136. Although not shown in FIG. 4, web server 136 may also include a network layer for communicating data across communication link 142. Customer computer 134 contains one or more Java applets 162 and one or more JavaScript methods 160. Additional details regarding the operation of Java applets 162 and JavaScript methods 160 are provided below. Customer computer 134 also includes a browser application 158 of the type discussed above with respect to FIG. 2.

In a particular embodiment of the invention, an agent is able to "push" a web page or other information to a customer using the system shown in FIG. 4. For example, the agent may identify a particular web page and communicate the uniform resource locator (URL) associated with the web page to customer computer 134 via control server 130. The customer's browser application 158 receives the URL and retrieves the associated web page from web server 136. Thus, the agent "pushes" the web page to the customer by providing the URL associated with the web page to the customer's browser application.

Figure 5:
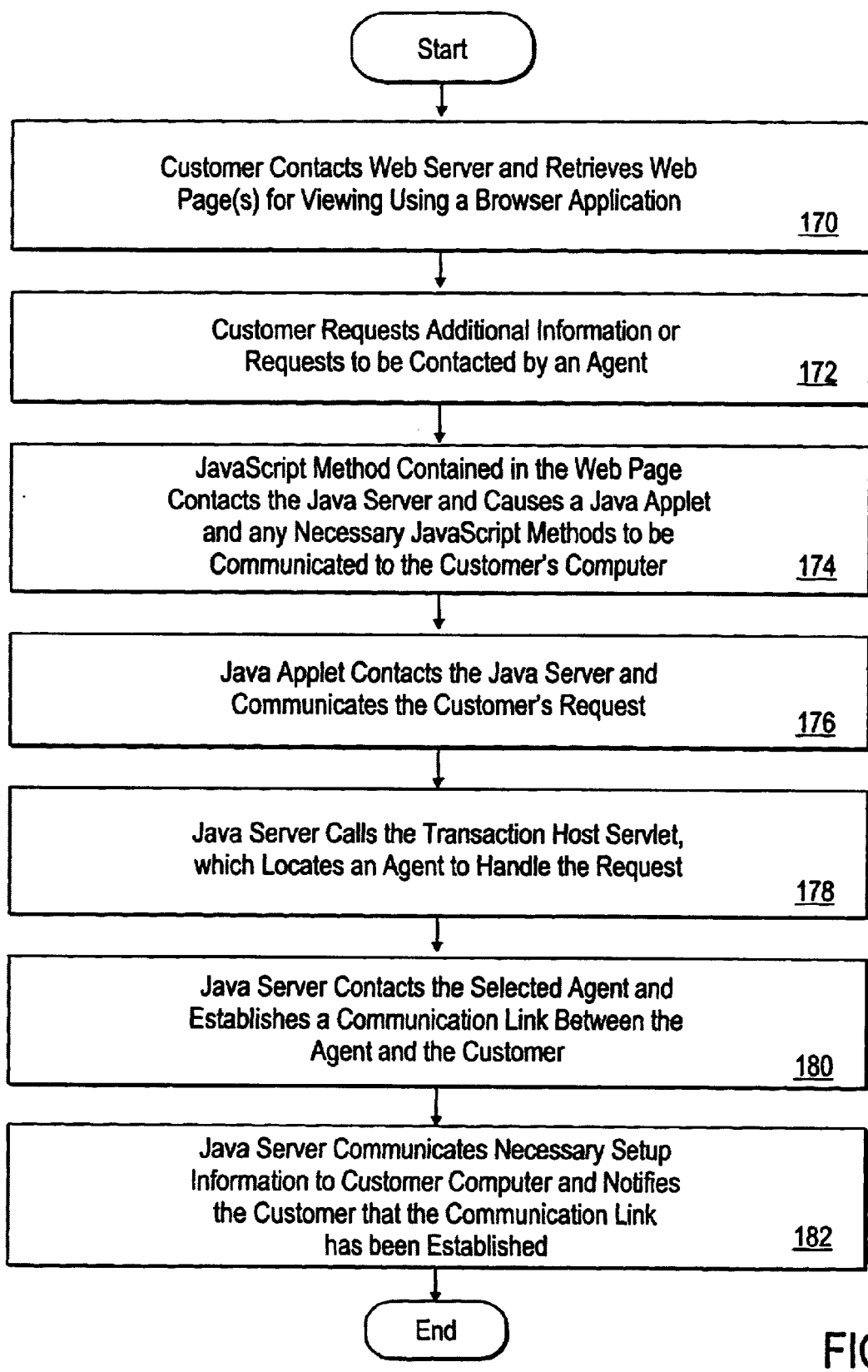
FIG. 5 is a flow diagram illustrating an embodiment of a procedure for communicating information between various devices using the architecture of FIG. 4.

FIG. 5 is a flow diagram illustrating an embodiment of a procedure for communicating information between various devices using the architecture of FIG. 4. At step 170, a customer contacts a web server (e.g., web server 136) and retrieves one or more web pages for viewing using a browser application (e.g., browser application 158). At step 172, the customer requests additional information about a product or service, or requests to be contacted by an agent. The customer may specify the manner in which the information or agent contact is handled (e.g., by return telephone call, by e-mail, or by facsimile). If the customer requests to be contacted using a conventional telephone or by facsimile, then the customer is asked to provide a telephone number for initiating the telephone call or facsimile. At step 174, a JavaScript method, contained in the web page accessed by the customer, is executed by the customer's browser application. When executed, the JavaScript method causes the customer's computer to contact the Java server (e.g., Java server 154) and requests a Java applet and any necessary JavaScript methods. The requested Java applet and JavaScript methods are then communicated from the Java server to the customer's computer. The particular Java applet and JavaScript methods communicated to the customer's computer may vary depending on the web page that was being viewed by the customer when the request for additional information or agent contact was entered. The particular web page being viewed may contain JavaScript methods that identify the necessary Java applet and JavaScript methods to be communicated to the customer's computer.

At step 176, the Java applet (running on the customer's computer) contacts the Java server and communicates the customer's request to the Java server. In this example, the customer has requested that an agent contact the customer by return telephone call. Step 178 calls the transaction host servlet (e.g., the servlet that performs the functions of transaction host 102 in FIG. 3), which locates an agent to handle the customer's request. An agent may be located by communicating with transaction processing system manager 120 to select an agent and to initiate a telephone call across the PSTN.

After an agent has been selected to handle the customer's request, step 180 contacts the selected agent and informs the agent regarding the customer's request. At this time, information about the customer may be displayed to the selected agent (e.g., account information, or past purchases). Step 180 also establishes a communication link (in this example, a telephone link) between the selected agent and the customer. A transaction processing system may be used to automatically establish the telephone link across a PSTN or a web server may be used to establish an Internet telephone call across the Internet. In particular embodiments of the invention, both a voice communication link and a data communication link are established between the agent and the customer. The data communication link can be established and maintained by the control server. Both the agent computer and the customer computer may communicate with the control server, which coordinates the flow of messages and other information between the agent and the customer. For example, the control server forwards messages received from the agent computer system to the customer computer system, and vice versa.

At step 182, the Java server communicates any necessary setup information to the customer's computer and notifies the customer that the communication link has been established. This notification can be performed, for example, by communicating through the network layers to the customer's browser application. In this example, the customer requested a return telephone call. Although a return telephone call has been initiated, the customer and the agent may continue to communicate using their browser applications. For example, the agent may "push" web pages or other information to the customer for viewing using the customer's browser application.

Figure 6:
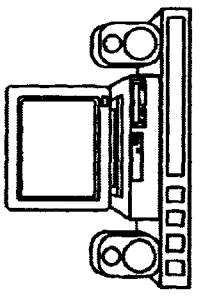
FIG. 6 illustrates an embodiment of various windows displayed to an agent using the agent's computer.

FIG. 6 illustrates an embodiment of various windows (also referred to as frames) displayed to an agent using the agent's computer. An agent's computer includes a display device that provides visual information to the agent. In FIG. 6, an agent's browser application generates a display 190 containing multiple frames 192, 194, 196, 198, and 200. Frame 192 represents the web page or other information currently being displayed to the customer. Thus, the agent is able to easily determine what information is available to the customer based on frame 192. Additionally, the agent can provide additional information about a product or service while referring to the information already displayed to the customer. Frame 194 is a text chat window that allows the agent and the customer to communicate using typed information. The text chat window can be used at any time, and is particularly useful when a voice connection cannot be established between the agent and the customer (e.g., the customer does not have an Internet phone and has only one telephone line, which is used to access the Internet).

Frame 196 of display 190 contains various system information such as information about the agent and information relating to the overall system performance. Frame 196 may also be used to display messages to an agent from a supervisor or system administrator (e.g., asking the agent if they are available to work overtime, or notifying the agent of their next scheduled break). Frame 198 displays agent script information, such as a prepared script to be read to a customer. The script displayed in frame 198 may be modified to correspond to the product or service being discussed, or the script may be modified to include information about the customer (e.g., the customer's name). Frame 200 provides various links to information that may be provided by the agent to the customer. In a particular embodiment of the invention, the links shown in frame 200 are associated with web pages that contain information of interest to particular customers. For example, the link "FAQ—Acme XL-3000" may identify a web page that contains answers to frequently asked questions about the Acme XL-3000 computer system. If the agent wants to display these answers to the customer, the agent can select the link, which causes the web page to be transmitted to the customer's browser application. The same web page is then displayed in frame 192, to maintain correspondence between frame 192 and the web page displayed to the customer.

Figure 7:
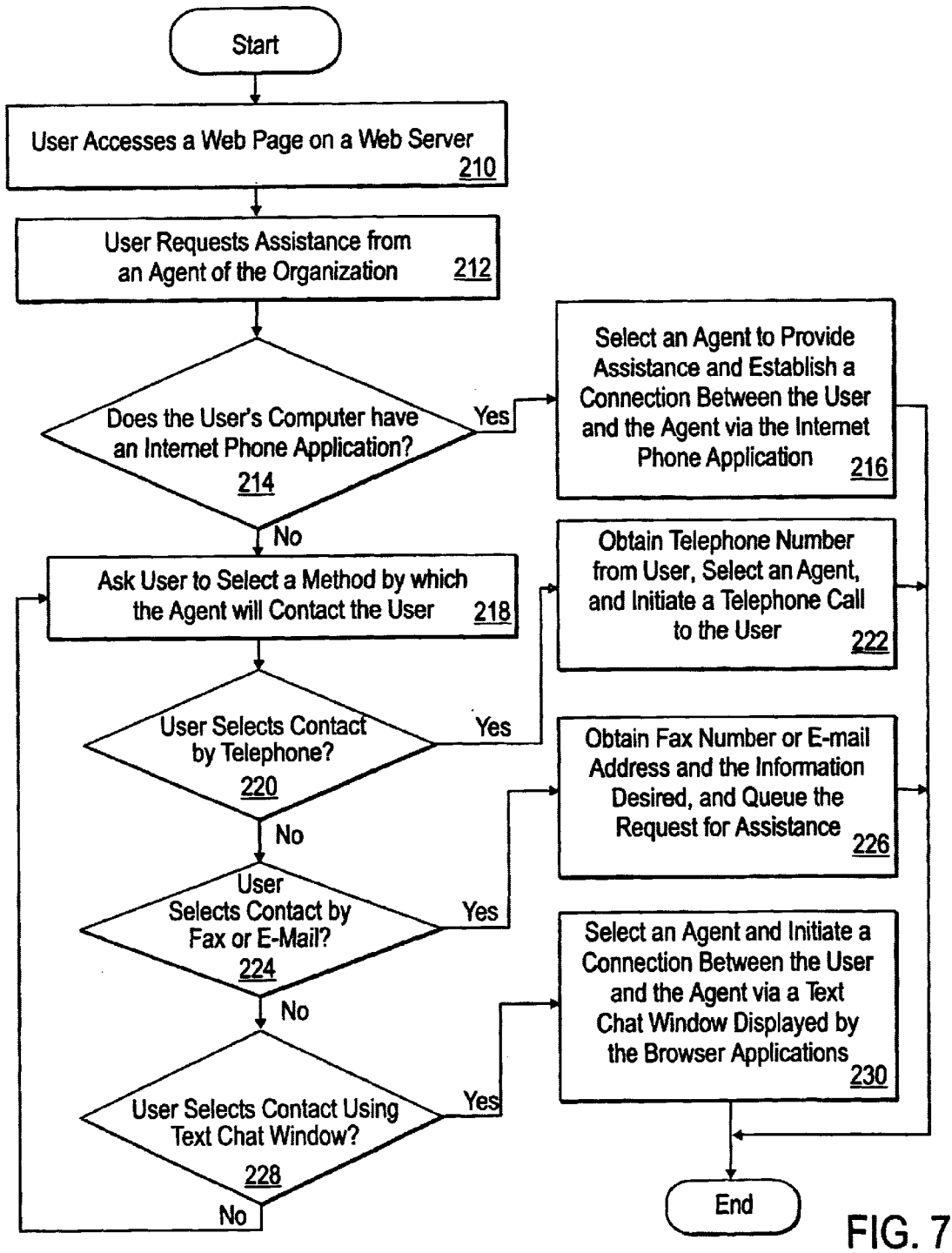
FIG. 7 is a flow diagram illustrating an embodiment of a procedure for establishing communication between two systems.

FIG. 7 is a flow diagram illustrating an embodiment of a procedure for establishing communication between two systems (e.g., between a customer (or user) and an agent or other representative of a company or organization). At step 210, a user accesses a web page on a web server (e.g., web server 66 shown in FIG. 2). At step 212, the user requests assistance from an agent or other representative of the company or organization. This request may be generated when the user selects a "Help" button or other icon associated with a request for information or assistance. At step 214, the procedure determines whether the user's computer has an Internet phone application. If the user's computer has an Internet phone application, then the procedure branches to step 216, where an agent is selected to provide assistance to the user. Additionally, step 216 establishes a connection between the user and the selected agent using the Internet phone application. Once the Internet phone connection has been established, the user and the agent can communicate verbally using the Internet phone connection and communicate data using the web browser application on each individual's system.

If the user's computer does not have an Internet phone application, then the procedure continues to step 218, where the user is asked to select a method by which an agent will contact the user. The user may choose to be contacted by telephone, facsimile, e-mail, voice-mail, or using a text chat window displayed by the browser application. If the user chooses to be contacted by telephone, facsimile, or voice-mail, then the user is asked to provide a telephone number for initiating the contact. If the user chooses to be contacted by e-mail, the user is asked to provide an e-mail address. If the user chooses to be contacted by facsimile, voice-mail, or e-mail (methods that do not provide direct communication between the user and the agent), the user is asked to provide a specific question or provide a detailed request for information. This specific information is not necessary if the user chooses to be contacted by telephone or using a text chat window because the agent and the user will be in direct communication with one another.

Step 220 determines whether the user chose to be contacted by telephone. If the user selected contact by telephone, then the procedure branches to step 222 to obtain the telephone number from the user and select an agent to assist the user. Additionally, step 222 initiates a telephone call to the user and provides information about the user to the agent. The procedures and systems used to select an agent, initiate a telephone call, and display user information to the agent are discussed above with respect to FIGS. 1–5.

If the user did not choose to be contacted by telephone, the procedure continues from step 220 to step 224, where the procedure determines whether the user chose to be contacted by facsimile or e-mail. If the user chose contact by facsimile or e-mail, then the procedure branches to step 226 to obtain a facsimile number or an e-mail address from the user. Additionally, step 226 obtains the information desired or any specific questions that caused the user to request assistance from an agent of the organization. If an agent is currently available to handle the request, then the request and other information collected from the user is forwarded to the agent for processing. If all agents are currently busy, the request is placed in a queue for handling by an agent in the future.

If the user did not choose to be contacted by facsimile or e-mail, the procedure continues from step 224 to step 228 to determine whether the user chose to be contacted using a text chat window. If yes, the procedure branches to step 230, where an agent is selected to assist the user. Step 230 also initiates a connection between the user and the agent via a text chat window (e.g., text chat window 194 shown in FIG. 6). If the user did not choose to communicate with the agent using a text chat window, then an error or other problem occurred when the user entered the contact method. The procedure returns to step 218 to allow the user to reselect a method by which the agent will contact the user. Alternatively, the procedure may generate an error message to the user and ask the user to restart the procedure by repeating the request for assistance (e.g., by reselecting the "Help" button).

Other embodiments of the invention allow the user to be contacted by voice-mail. Although not shown in FIG. 7, the procedure may include a step to determine if the voice-mail contact option was selected by the user. If selected, the procedure handles the voice-mail request in a manner similar to step 226 by requesting a telephone number, obtaining information about the assistance desired, and queuing the request (or providing the request to an agent if an agent is available).

The procedure discussed above with respect to FIG. 7 allows a user and an agent to interact or communicate by exchanging both data (such as video data) and voice signals (in the case of an Internet phone call or a conventional telephone call). The display of data to the user and the agent can be performed by a web browser application. Particular embodiments of the procedures for exchanging data between the user and the agent use Java applets and JavaScript methods, as discussed above. Additional details regarding the communication of information between the user and the agent are discussed above with respect to FIGS. 1–5.

Embodiments of the invention provide a system that automatically correlates changes between the agent's browser application and the user's browser application. For example, if the user or agent selects a different web page for viewing, the procedures controlling the communication of information between the user and the agent communicate the new web page URL to the other individual's browser application, which retrieves the web page associated with the URL. Similarly, if the user or agent completes a portion of a form (e.g., a form represented as a web page), the changes or entries on the form are communicated to the other individual's browser application. Thus, if the user completes a portion of a form, the information entered by the user is displayed to the agent using the agent's browser application. Additionally, an agent is able to "push" a web page or other information displayed on the agent's browser application to a user's browser application for viewing. For example, a spreadsheet page or other image can be pushed from the agent's browser application to the user's browser application. Additionally, the user may push an image or other information from the user's browser application to the agent's browser application.

Embodiments of the invention also provide a mechanism for highlighting or selectively marking on a portion of an image. The highlighted markings are communicated to the other individual's browser application, thereby correlating the two browser displays. This highlighting function allows the agent or the user to highlight a particular portion of an image (such as a web page) when discussing the image with the other individual.

Figure 8:
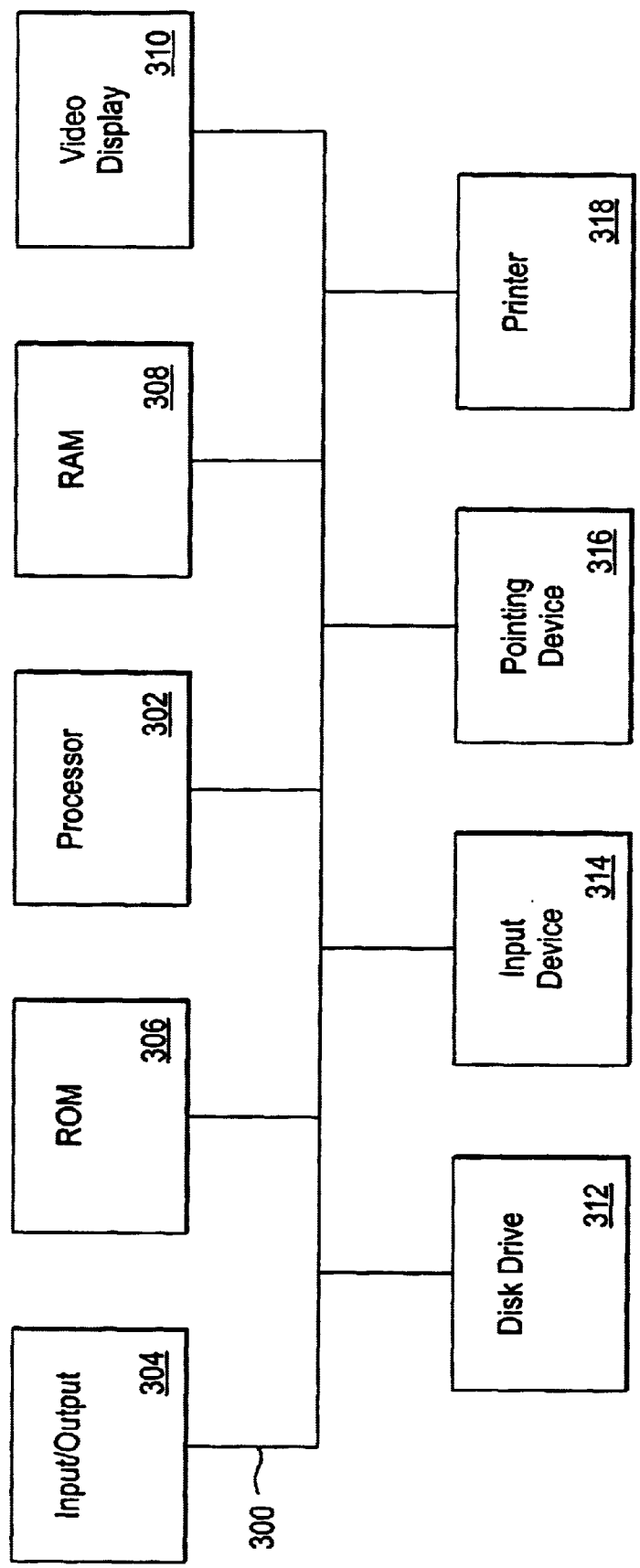
FIG. 8 illustrates an embodiment of a computer system that can be used with the present invention.

FIG. 8 illustrates an embodiment of a computer system that can be used with the present invention. For example, embodiments of the invention may use a computer of the type shown in FIG. 8 for an agent's computer, a customer's computer, a server, a transaction processing system, or any other device contained in or used with the transaction processing environment discussed above. The various components in FIG. 8 are provided by way of example. Certain components of the computer in FIG. 8 can be deleted for particular implementations of the invention. The computer system shown in FIG. 8 may be any type of computer, including a general purpose computer.

FIG. 8 illustrates a system bus 300 to which various components and devices are coupled. A processor 302 performs the processing tasks required by the computer. Processor 302 may be any type of processing a device capable of implementing the steps necessary to perform the various procedures and operations discussed above. An Input/Output (I/O) device 304 is coupled to bus 300 and provides a mechanism for communicating with other devices coupled to the computer. A Read Only Memory (ROM) 306 and a Random Access Memory (RAM) 308 are coupled to bus 300 and provide a storage mechanism for various data and information used by the computer. Although ROM 306 and RAM 308 are shown coupled to bus 300, in alternate embodiments, ROM 306 and RAM 308 are coupled directly to processor 302 or coupled to a dedicated memory bus (not shown).

A video display 310 is coupled to bus 300 and displays various information and data to the user of the computer. A disk drive 312 is coupled to bus 300 and provides a mechanism for the long-term mass storage of information. An input device 314 and a pointing device 316 are also coupled to bus 300 and allow the user of the computer to enter information and commands to the computer system. Input device 314 may be, for example, a keyboard, keypad, handwriting recognition device, or voice recognition device. Pointing device 316 includes, for example, a mouse, track ball, or touch pad. A printer 318 is coupled to bus 300 and is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computer-readable medium is used to perform various data communication, data processing, and data handling operations, such as those described above. The computer-readable medium may be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of establishing communication between a first system and a second system, the method comprising:

receiving a request to establish a connection between the first system and the second system;

establishing a first connection between the first system and the second system, wherein the first connection is to communicate visual data between the first system and the second system, wherein the first connection includes an Internet communication link to communicate data between the first system and the second system via the Internet; and, establishing a second connection between the first system and the second system, wherein the second connection is to communicate audible data between the first system and the second system, wherein the first system and the second system communicate using both the first connection and the second connection, wherein the receiving of the request includes receiving a request to establish the second connection between the first system and the second system across the first connection, and wherein the establishing of the first connection between the first system and the second system enables a first user at the first system and a second user at the second system to interactively modify common visual data that is displayed at the first system to the first user and displayed at the second system to the second user.

2. The method of claim 1, wherein the first connection includes a network communication link to communicate data between the first system and the second system.

3. The method of claim 1, wherein the second connection includes a telephone communication link to communicate telephony signals between the first system and the second system.

4. The method of claim 1, wherein a user of the first system is to communicate with a user of the second system by utilizing both the first connection and the second connection simultaneously.

5. The method of claim 1, further comprising:

communicating changes made to visual data on the first system to the second system across the first connection.

6. A method of communicating data between a first system and a second system, the method comprising:

establishing a first connection between the first system and the second system, wherein the first connection is to communicate data across a data network, wherein the data network includes an Internet communication link to communicate data between the first system and the second system via the Internet;

establishing a second connection between the first system and the second system, wherein the second connection is to communicate telephony signals across a telephone switching network; and simultaneously communicating data between the first system and second system using the first connection and communicating telephony signals between the first system and second system using the second connection, wherein the second connection is established between the first system and the second system responsive to a request received across the first connection, and wherein the establishing of the first connection between the first system and the second system enables a first user at the first system and a second user at the second system to interactively modify common visual data that is displayed at the first system to the first user and displayed at the second system to the second user.

7. The method of claim 6, wherein the telephone switching network includes a portion of a public switched telephone network (PSTN).

8. The method of claim 6, wherein a user of the first system is to communicate with the user of the second system by utilizing both the first connection and the second connection simultaneously.

9. The method of claim 6, further comprising:

displaying data communicated across the first connection using a first browser application on the first system and a second browser application on the second system.

10. The method of claim 9, further comprising:

automatically communicating changes made to data displayed in the first browser application on the first system to the second browser application on the second system.

11. The method of claim 9, further comprising:

selectively communicating information displayed in the first browser application on the first system to the second browser application on the second system.

12. A computer software product including a medium readable by a processor, the medium having stored thereon a sequence of instructions which, when executed by the processor, cause the processor to:

receive a request to establish a connection between a first system and a second system;

establish a first connection between the first system and the second system, wherein the first connection is to communicate visual data between the first system and the second system, wherein the first connection includes an Internet communication link to communicate data between the first system and the second system via the Internet; and establish a second connection between the first system and the second system, wherein the second connection is to communicate audible data between the first system and the second system, wherein the first system and the second system communicate using both the first connection and the second connection, wherein the receiving of the request includes receiving a request to establish the second connection between the first system and the second system across the first connection, and wherein the establishing of the first connection between the first system and the second system enables a first user at the first system and a second user at the second system to interactively modify common visual data that is displayed at the first system to the first user and displayed at the second system to the second user.

13. The computer software product of claim 12, wherein the first connection includes a network communication link to communicate data between the first system and the second system.

14. The computer software product of claim 12, wherein the second connection includes a telephone communication link to communicate telephony signals between the first system and the second system.

15. The computer software product of claim 12, wherein a user of the first system is to communicate with a user of the second system by utilizing both the first connection and second system simultaneously.

16. The computer software product of claim 12, further including instructions which, when executed by the processor, cause the processor to:

communicate changes made to visual data on the first system to the second system across the first connection.

17. The method of claim 1 wherein the visual data is text.

18. The method of claim 17 wherein the text is copied from an application program.

19. The method of claim 1 wherein the visual data is a web page.

20. The method of claim 1 wherein the visual data is a form.

21. The method of claim 1 wherein the visual data is multimedia.

22. The method of claim 1 wherein the visual data is an image.

23. The method of claim 22 wherein the image may be selectively marked.

24. The method of claim 23 wherein the mark is highlighted.

25. The method of claim 22 wherein the image is a spreadsheet page.

26. The method of claim 1 wherein the display of visual data is performed by a web browser application.

27. The method of claim 1 wherein modifying the visual data is enabled by filtration and modification of web based content.

28. The method of claim 27 wherein the modification of web based content includes embedding Java applets and Java methods.

29. The method of claim 1, further including selecting the common visual data by an at least one of the first user and the second user wherein the selecting includes the first user and the second user utilizing the first connection.

30. The method of claim 29, wherein the selecting of common visual data includes selecting a web page.

31. The method of claim 30, wherein the selecting of the web page includes communicating the URL associated with the web page.

* * * * *